United States Patent [19]

Gerstner

[11] 4,183,021

[45] Jan. 8, 1980

[54] CIRCUIT ARRANGEMENT

[75] Inventor: Dieter Gerstner, Heilbronn, Fed. Rep. of Germany

[73] Assignee: Licentia Patent-Verwaltungs-G.m.b.H., Frankfurt, Fed. Rep. of Germany

[21] Appl. No.: 782,546

[22] Filed: Mar. 29, 1977

[30] Foreign Application Priority Data

Mar. 31, 1976 [DE] Fed. Rep. of Germany ....... 2613647

[51] Int. Cl.² .......... G01D 7/00

[52] U.S. Cl. .......... 340/753; 340/782

[58] Field of Search .......... 340/324 R, 378 R, 753, 340/754, 782; 324/96

[56] References Cited

U.S. PATENT DOCUMENTS

| | | | |
|---|---|---|---|
| 3,824,581 | 7/1974 | Ohno | 340/324 R |
| 3,835,465 | 9/1974 | Tannas et al. | 340/378 R |
| 3,987,392 | 10/1976 | Kugelmann et al. | 340/324 R |
| 4,011,557 | 3/1977 | Chetelat et al. | 340/324 R |
| 4,025,845 | 5/1977 | Lhommelet et al. | 324/96 X |
| 4,077,032 | 2/1978 | Volkman | 340/324 R |

*Primary Examiner*—David L. Trafton

*Attorney, Agent, or Firm*—Spencer & Kaye

[57] ABSTRACT

A circuit arrangement of luminescence diodes with a minimum of control lines. The circuit arrangement comprises two current branches each having a plurality of luminescence semiconductor components with forward/reverse characteristics connected in series in the same polarity, the components in each branch having opposite polarities and control lines each connected to one side of at least one component.

13 Claims, 4 Drawing Figures

NUMBER-SEQUENCE 1÷5

NUMBER-SEQUENCE 1÷14

CIRCUIT ARRANGEMENT

BACKGROUND OF THE INVENTION

The invention relates to a circuit arrangement made up of a plurality of luminescence semiconductor components having a forward/reverse characteristic and having control lines leading to at least one part of the semiconductor components.

Circuit arrangements of this type are used, in many cases, for analog displays. Today the speeds in vehicles, the level of fullness in containers, the desired and actual state at control panels and the matching of stereo devices is displayed by showing a variable luminous dot or a variable luminous strip. In arrangements already known, light-emitting diodes are used made of GaAsP or GaP. A plurality of light-emitting diodes is arranged for example in a line and provided with a control circuit, by means of which individual light-emitting diodes or a variable series of light-emitting diodes may be made to illuminate. When there is a change in the information to be shown, then in these known display arrangements either a luminous dot moves on a scale or the length of a luminous strip is altered. A luminous strip which may be changed and which contains the information to be reproduced may be compared for example with a thermometer while a luminous dot, which may move across a predetermined scale range, may be compared to a moving-coil instrument.

The manufacturing costs of the described light-emitting analog display are determined essentially by the number of control lines required. Furthermore, the current requirement of the display unit must be kept as small as possible and this can be attributed to the fact that only a current of limited value may be derived from an integrated control circuit.

A circuit has already become known in which the control of a line of light-emitting diodes having a total of 16 light-emitting diodes takes place by means of 8 control lines. Thus the diodes are generally connected in the form of a X/Y matrix. This circuit is provided for showing a variable luminous dot, but is not suitable for luminous strip display as the current requirement is too large when controlling all diodes.

In a known luminous strip display the current from an integrated control circuit is passed through several light-emitting diodes one after the other. Thus a control line leads to each individual diode of the whole arrangement so that a total of 17 control lines are required in order to implement a luminous strip line made up of 16 diodes—if the required earth line is taken into account. This number of lines can only be accommodated at high cost in an integrated circuit.

SUMMARY OF THE INVENTION

It is an object of the invention to provide a circuit arrangement, such as that of the type described at the outset, with which both a changeable luminous dot and a luminous strip line of different length may be realized and which manages with the fewest possible control lines at a small maximum current-carrying capacity.

According to the invention, there is provided a circuit arrangement including a plurality of individual current branches each including several luminescent diodes connected in series and with each current branch connected in parallel with another current branch but with opposite polarities to form a current branch pair, wherein each pair of current branches is connected between a line common to all current branches and a control line common to the current branch pair; wherein additional control lines lead to connecting points between every two diodes in a current branch, these control lines being connected to an associated connecting point between two diodes in the parallel-connected current branch, so that the number of control lines for a current branch pair corresponds at most to the number of diodes in one current branch.

Further according to the invention, there is provided a circuit arrangement made up of a plurality of luminescence semiconductor components having a forward-/reverse characteristic and having control lines leading to at least one part of the semiconductor components, characterised in that two current branches are connected in parallel with each branch having several semiconductor components connected in series and that the components arranged in one current branch have the same polarity but this polarity is opposite to the polarity of the components in the parallel-connected current branch.

BRIEF DESCRIPTION OF THE DRAWINGS

The invention will now be described in greater detail, by way of example, with reference to the drawings, in which.

DESCRIPTION OF THE PREFERRED EMBODIMENT

Figure 1:
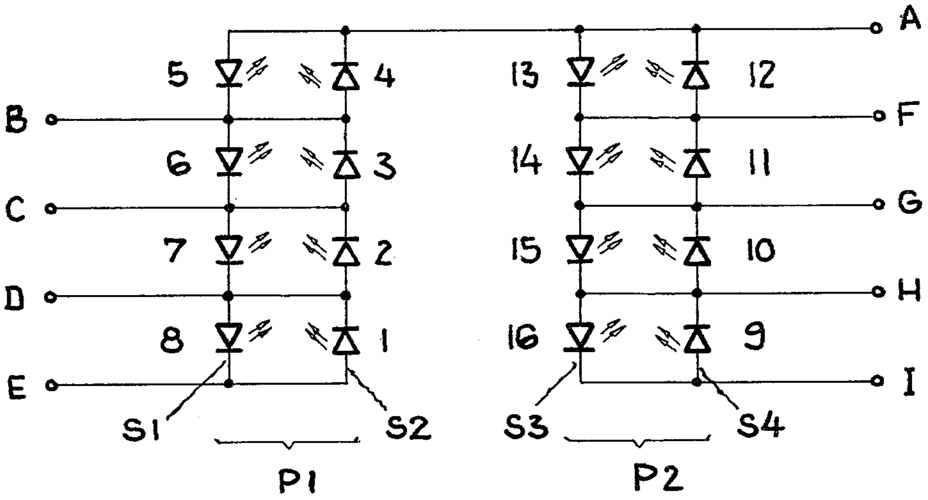
FIG. 1 shows the connection of sixteen light-emitting diodes, in accordance with the invention.

In a preferred embodiment of the invention in a circuit arrangement made up of a plurality of luminescence semiconductor components it is proposed to connect two current branches in parallel with each branch having several semiconductor components connected in series; and to provide the components arranged in one current branch with the same polarity but this polarity is however opposite to the polarity of the components in the parallel-connected current branch.

Several current branch pairs made up of two parallel-connected current branches in each case may be connected to a line common to all current branches.

The semiconductor components, which are preferably luminescence diodes, are normally divided up over the current branches available so that the same number of diodes is arranged in the respective current branches. However there is also the possibility that some diode places may remain unoccupied in individual current branches.

The circuit arrangement in accordance with the invention only requires half as many control lines for the two types of operation as there are light-emitting diodes plus one line common to all current branches. Therefore, preferably, each pair of current branches is connected between the line common to all current branches, which is in many cases the earth line, and a control line common to the pair of current branches. An additional control line leads to connecting points between every two diodes in a current branch, the control line being connected to an associated connecting point between two diodes in the control lines for a pair of current branches corresponds at most to the number of diodes present in one current branch.

If for example sixteen diodes are divided up over four current branches wherein every two current branches are connected together in parallel to form a current branch pair, then a total of eight control lines and one earth line are required.

Preferably all diodes are arranged in a line in regard of geometry wherein this line is usually a straight line, particularly for the luminous strip display. However the line may also be constructed like a scale for the luminous dot display, in the form of a circle or an arc.

If diodes are to be controlled in each current branch of a current branch pair at the same time, then this takes place with the aid of a clock pulse operation by means of which the diodes in one current branch are controlled during one clock pulse phase and the diodes in the other current branch are controlled in the other clock pulse phase. Therefore it is advantageous to provide a control circuit by means of which the control lines may be connected by means of clock pulse operation one after the other to positive, negative or floating potential. Here by the expression "floating potential" is meant the fact that the control lines may be separated off from any external potential. The clock pulse frequency must be above the response sensitivity of the human eye so that the different control of individual diodes over time cannot be seen optically.

Referring now to the drawings in the circuit arrangement according to FIG. 1 sixteen light-emitting diodes are connected up and provided with control lines so that both individual diodes as well as any desired group of diodes may be controlled. Thus the light-emitting diodes are divided up in pairs into parallel-connected current branches. In the embodiment shown, it is a question of a total of sixteen light-emitting diodes which were divided into four current branches $S_1$, $S_2$, $S_3$ and $S_4$. Four diodes of the same polarity connected one behind the other are located in each current branch. Every two current branches in which the diodes have opposite polarities in the two current branches, are connected in parallel. These current branch pairs are connected to a common line A which normally forms the earth line. For every connecting point between two diodes a further control line is provided which leads to a connecting point respectively between two diodes in both current branches of a current branch pair. This means that these control lines which are designated with the letters B, C and D for the current branch pair $P_1$ and with the letters F, G and H for the current branch pair $P_2$, are connected to the cathodes of two diodes and to the anodes of a further two diodes. Each current branch pair $P_1$ and $P_2$ is connected between the earth line A and a control line E or I assigned to the respective current branch pair. The two control lines E and I are thus connected to an anode of a diode respectively and to the cathode of a further diode. The diodes in FIG. 1 were provided with numbers 1 to 16 wherein this numbering is freely chosen and only serves to further explain the invention.

It will now be described together with FIG. 2 how, for example, the diodes 1 to 5 are controlled so that an optical impression is formed as if all diodes 1 to 5 were illuminated at the same time. Thus the individual control lines in one clock pulse operation are provided with voltage potentials which are emitted by a suitable control circuit. With dual clock pulse operation a voltage having a positive pole is applied to line E for example in a first clock pulse between the control lines E and A, and this suffices to excite the light-emitting diodes 1 to 4 to emit light. Thus a voltage of 6 volts for example is necessary. In the following second clock pulse a potential negative with respect to A is applied to the control line B so that light-emitting diode 5 illuminates. As in this case only a single diode must be brought to illumination, a voltage of 1.5 volts is sufficient. This clock pulse sequence is constantly repeated at a frequency which is above the threshold of sensitivity of the human eye. For example a clock pulse frequency of 1 to 10 kHz is used.

Figure 3:
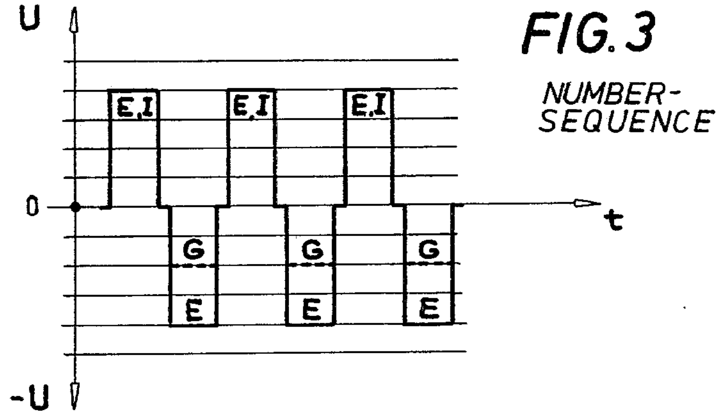
FIG. 3 shows how fourteen light emitting diodes are controlled by clock pulse operation.

FIG. 3 shows how the circuit according to FIG. 1 is controlled in the clock pulse operation so that all diodes 1 to 14 illuminate. In turn a dual clock pulse operation is assumed wherein a potential of a (particular) value which is positive with respect to A is applied to the control lines E and I in a first clock pulse, this potential being sufficient to bring diodes 1 to 4 and 9 to 12 to illumination. With a normal operating voltage of 1.5 volts per diode, this applied potential is approximately 6 volts in an arrangement with four series connected diodes as shown. In a second clock pulse a potential which is negative with respect to A and of the same magnitude is applied to the control line E by means of which potential the diodes 5 to 8 are brought to illumination. At the same time a negative potential is also applied to the control line G through which potential the diodes 13 and 14 are brought to illumination. The potential at G may thus be half as large as the potential at E, as only two diodes have to be controlled by means of the control line G. Control of the circuit arrangement according to FIG. 1 may also take place in a four clock pulse operation wherein the control lines E and I are controlled by special clock pulses at positive potential and the control lines G and E are controlled in special clock pulses at negative potential.

Figure 4:
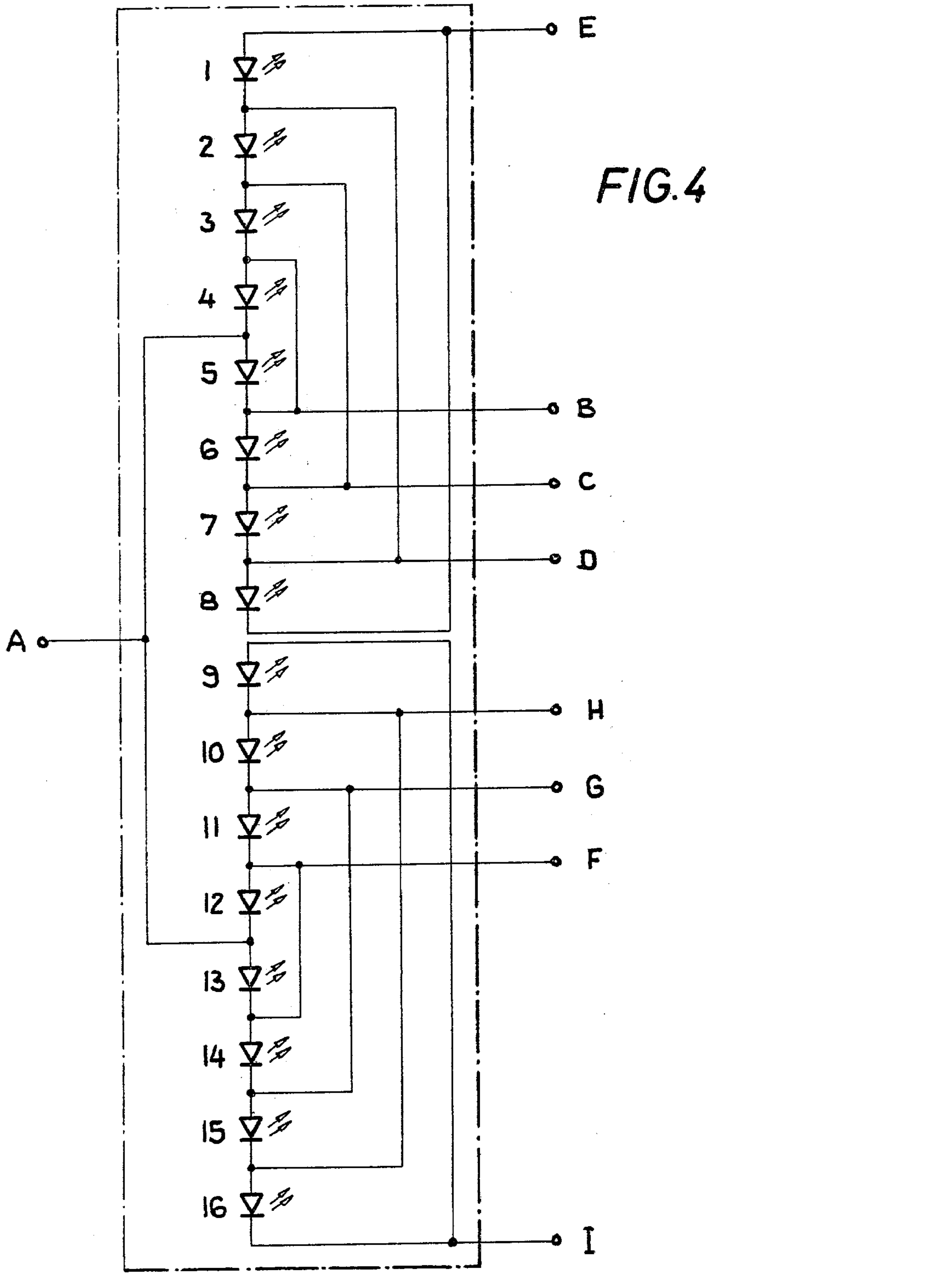
FIG. 4 shows the circuit according to FIG. 1 wherein all diodes are arranged in the form of a single straight line.

In FIG. 4 the circuit according to FIG. 1 was redrawn so that all light-emitting diodes are arranged one behind the other in a line in the form of a straight line. This arrangement is required for example for implementing a luminous strip. With a control as was described in relation to FIG. 2, the luminous strip was based on the diode 1 and would end at diode 5; with a control according to FIG. 3 the phosphor strip would however extend up to diode 14.

Figure 2:
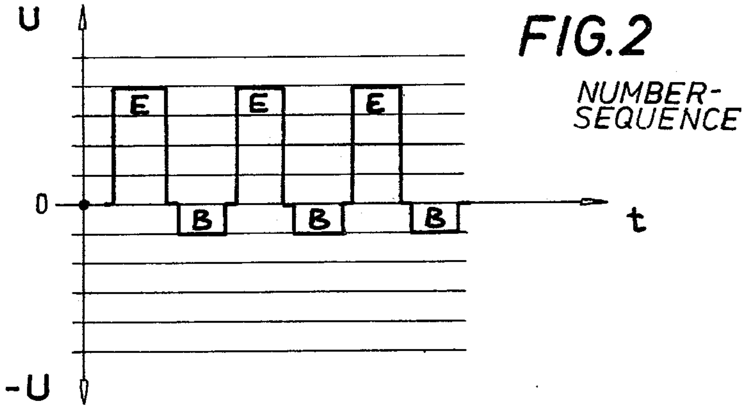
FIG. 2 shows how five light-emitting diodes are controlled by clock pulse operation.

In the same way as was described in relation to FIGS. 2 and 3 any other number of light-emitting diodes may be brought to illumination. There is also the opportunity of isolating a group of diodes from the circuit according to FIG. 1 or FIG. 4 and of controlling these separately. In order to control for example diodes 9 to 11 earth potential would be applied to the control line F and the control line I would be provided with a positive potential which is sufficient for illuminating three diodes. Furthermore there is the opportunity of controlling individual diodes if the desired display takes place by means of a variable luminous dot. For example, a voltage driving the light-emitting diode in a flow direction is then applied between the control line C and D for the purpose of controlling the light-emitting diode 7, the voltage being sufficient to excite the light-emitting diode 7 to emit light.

It is necessary, in order to be able to exhaust the stated possibilities of operation, for each control line, including line A, to be capable of connection to a positive, negative or floating potential. In this way the circuit in accordance with the invention may be used universally and may be matched to the necessary demands in analog display.

It will be understood that the above description of the present invention is susceptible to various modifications, changes and adaptations.

What is claimed is:

1. In a circuit arrangement made up of a plurality of luminescence semiconductor components having a forward/reverse characteristic and having control lines leading to at least one part of the semiconductor components, the improvement comprising: a plurality of current branch pairs each including two current branches ($S_1$, $S_2$ or $S_3$, $S_4$) connected in parallel with each said current branch consisting of several said semiconductor components connected in series with the same polarity, and with the polarity of said components in one current branch being opposite to the polarity of said components in the parallel-connected current branch; a line (A) common to all current branches; each of said current branch pairs being connected between said line common to all current branches and a respective control line common to the current branch pair; and a respective additional control line connected to the connecting point between every two of said components in a current branch and to an associated connecting point between two of said components in the parallel-connected current branch, so that the number of control lines for a current branch pair corresponds at most to the number of said components in one current branch.

2. A circuit arrangement as defined in claim 1, wherein said semiconductor components comprise luminescence diodes.

3. A circuit arrangement as defined in claim 2, wherein each said current branch comprises the same number of diodes.

4. A circuit arrangement as defined in claim 2, wherein possible diode places remain unoccupied in individual current branches.

5. A circuit arrangement as defined in claim 2, wherein all said diodes are arranged in a line in regard of geometry.

6. A circuit arrangement as defined in claim 5, wherein said line is a straight line.

7. A circuit arrangement as defined in claim 5, wherein the line is at least part of a circle.

8. A circuit arrangement as defined in claim 2, wherein two said current branch pairs are provided with four diodes each in each said current branch; and wherein eight of said control lines and one said line common to all current branches are provided for the total of sixteen diodes.

9. A circuit arrangement as defined in claim 2, wherein a further control line is provided for enabling said control lines to be connected in clock pulse operation, one after the other, to a positive, negative or floating potential.

10. A circuit arrangement as defined in claim 9, wherein all diodes to be controlled having the same polarity present in different current branches are connected, as a result of one clock pulse to a suitable potential causing light emission; and wherein all diodes to be controlled having opposite polarity are connected to a suitable potential directed oppositely to the first potential as a result of the next following clock pulse to cause light emission.

11. A circuit arrangement as defined in claim 9, wherein said clock pulse frequency is considerably above the response sensitivity of the human eye.

12. A circuit arrangement as defined in claim 2, wherein said diodes are used to display a variable luminous strip.

13. A circuit arrangement as defined in claim 2, wherein said diodes are used to display a movable luminous dot.

* * * * *